United States Patent
Okawa et al.

(10) Patent No.: US 9,540,551 B2
(45) Date of Patent: Jan. 10, 2017

(54) HEAT-CURABLE POLYORGANOSILOXANE COMPOSITION AND USE THEREOF

(75) Inventors: Koji Okawa, Tokyo (JP); Kazuhisa Ono, Tokyo (JP)

(73) Assignee: MOMENTIVE PERFORMANCE MATERIALS JAPAN LLC, Tokyo (JP)

(*) Notice: Subject to any disclaimer, the term of this patent is extended or adjusted under 35 U.S.C. 154(b) by 683 days.

(21) Appl. No.: 13/700,573

(22) PCT Filed: Dec. 6, 2011

(86) PCT No.: PCT/JP2011/078146
§ 371 (c)(1),
(2), (4) Date: Nov. 28, 2012

(87) PCT Pub. No.: WO2012/086404
PCT Pub. Date: Jun. 28, 2012

(65) Prior Publication Data
US 2013/0071673 A1    Mar. 21, 2013

(30) Foreign Application Priority Data
Dec. 22, 2010 (JP) ................................. 2010-286155

(51) Int. Cl.
| | | |
|---|---|---|
| *C09J 183/07* | (2006.01) | |
| *C09J 183/04* | (2006.01) | |
| C08G 77/12 | (2006.01) | |
| C08K 5/5419 | (2006.01) | |
| C08G 77/20 | (2006.01) | |
| C08K 5/56 | (2006.01) | |

(52) U.S. Cl.
CPC .............. *C09J 183/04* (2013.01); *C08G 77/12* (2013.01); *C08G 77/20* (2013.01); *C08K 5/5419* (2013.01); *C08K 5/56* (2013.01); *Y10T 428/31663* (2015.04)

(58) Field of Classification Search
CPC ........ C08K 5/5419; C08K 5/56; C09J 183/04; C08L 83/00; C08G 77/12; C08G 77/20
See application file for complete search history.

(56) References Cited

U.S. PATENT DOCUMENTS

| | | | |
|---|---|---|---|
| 3,884,866 A * | 5/1975 | Jeram et al. .................. 523/203 |
| 4,935,455 A | 6/1990 | Huy et al. | |
| 5,011,865 A | 4/1991 | Johnson | |
| 5,424,384 A * | 6/1995 | Gentle ................... C08G 77/50 252/600 |
| 5,432,280 A | 7/1995 | Hara et al. | |
| 5,548,038 A | 8/1996 | Enami et al. | |
| 2002/0160624 A1* | 10/2002 | Yamakawa et al. .......... 438/780 |
| 2007/0275255 A1 | 11/2007 | Ooms et al. | |
| 2008/0266273 A1* | 10/2008 | Slobodin et al. ............. 345/174 |
| 2009/0281243 A1* | 11/2009 | Takanashi et al. .......... 525/100 |
| 2009/0296033 A1 | 12/2009 | Shinya et al. | |

(Continued)

FOREIGN PATENT DOCUMENTS

| | | |
|---|---|---|
| EP | 0 769 528 A2 | 4/1997 |
| EP | 2226360 A1 | 9/2010 |

(Continued)

OTHER PUBLICATIONS

International Search Report for PCT/JP2011/078146 mailed Feb. 14, 2012.

(Continued)

*Primary Examiner* — Michael B Nelson
(74) *Attorney, Agent, or Firm* — Holtz, Holtz & Volek PC

(57) ABSTRACT

A heat-curable polyorganosiloxane composition which includes (A) an alkenyl group-containing linear polyorganosiloxane of the formula (I) below, wherein $R^a$ represents a $C_2$-$C_6$ alkenyl and $R^b$ represents a $C_1$-$C_6$ alkyl or a phenyl; (B1) a linear polyorganohydrogensiloxane of the formula (II) below, wherein $R^c$ is hydrogen and $R^d$ represents a $C_1$-$C_6$ alkyl or a phenyl; (B2) a cyclic polyorganohydrogensiloxane including $R^e{}_2HSiO_{1/2}$, wherein $R^e$ represents a hydrogen atom or $C_1$-$C_6$ alkyl group, and $SiO_{4/2}$, and having three or more hydrogen atoms bonded to a silicon atom in one molecule; (C) a platinum series catalyst; and (D) an adhesion promoter, wherein the formula (I) and the formula (II) are as follows:

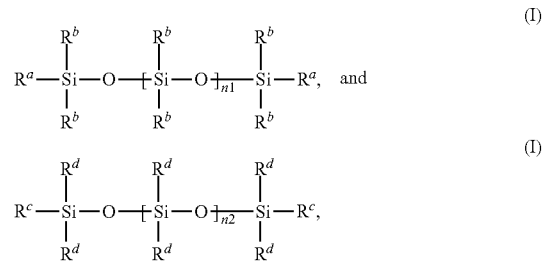

4 Claims, No Drawings

(56) References Cited

U.S. PATENT DOCUMENTS

2010/0210794 A1* 8/2010 Frese et al. .................. 525/478
2010/0224906 A1   9/2010 Kashiwagi et al.
2010/0301377 A1  12/2010 Kato et al.

FOREIGN PATENT DOCUMENTS

| JP | 63-72775 A | 4/1988 |
| JP | 1-286939 A | 11/1989 |
| JP | 2-151660 A | 6/1990 |
| JP | 2-245060 A | 9/1990 |
| JP | 3-64389 A | 3/1991 |
| JP | 3-74463 A | 3/1991 |
| JP | 6-107947 A | 4/1994 |
| JP | 7-134538 A | 5/1995 |
| JP | 7-268219 A | 10/1995 |
| JP | 8-157729 A | 6/1996 |
| JP | 9-169908 A | 6/1997 |
| JP | 2003165906 A | 6/2003 |
| JP | 2004-117831 A | 4/2004 |
| JP | 2005-171189 A | 6/2005 |
| JP | 2006-52331 A | 2/2006 |
| JP | 2008-150439 A | 7/2008 |
| JP | 2008-280368 A | 11/2008 |
| JP | 2008-282000 A | 11/2008 |

OTHER PUBLICATIONS

English-language International Preliminary Report on Patentability and Written opinion of the International Searching Authority, dated Jul. 11, 2013 for International Application PCT/JP2011/078146 filed Dec. 6, 2011; Applicants: Momentive Performance Materials Japan LLC.
U.S. Appl. No. 13/700,523.
Extended European Search Report dated Jul. 18, 2014 issued in counterpart European Application No. 11851378.7.
Japanese Office Action (and English translation thereof) dated Apr. 26, 2016, issued in counterpart Japanese Application No. 2012-141307.

* cited by examiner

HEAT-CURABLE POLYORGANOSILOXANE COMPOSITION AND USE THEREOF

CROSS-REFERENCE TO RELATED APPLICATION

This application is a United States national phase application of International Application PCT/JP2011/078146 filed Dec. 6, 2011.

TECHNICAL FIELD

The present invention relates to a heat-curable polyorganosiloxane composition, particularly to a heat-curable polyorganosiloxane composition to be used for adhesion of a base portion of an image display portion and a translucent protective portion of an image display device.

BACKGROUND ART

An image display device such as a cathode-ray tube, liquid crystal, plasma, organic EL, etc., has been generally constituted by using, as a polarization splitter, a polarization splitting type diffractive optical element (holographic color filter) in which incident light flux is diffracted and dispersed, and the light of the respective wavelength regions diffracted and dispersed is selectively focused to the positions of the picture elements corresponding to the respective colors of R (red color), G (green color) and B (blue color) formed on photoelastic modulators. Of these, a panel type image display device generally has a display area (an image display portion) in which a number of picture elements comprising a semiconductor layer or a fluorescent layer which constitutes an active element, or a light-emitting layer are provided in a matrix state between a pair of the substrate at least one of which has optical transparency such as a glass, and has been constituted by encapsulating the gap between the display area (an image display portion) and a protective portion formed by a glass or an optical plastic such as an acrylic resin with an adhesive extremely closely.

As the adhesive to be used for such a purpose, a thermosetting resin composition has generally bee used in place of the UV ray curing type resin composition for the structural reason that a light-shielding paint is applied to the outer frame portion of the protective portion of the image display device, and of these, an acrylic adhesive has been usually used. However, the acrylic adhesive has less wetting property with the parts whereby its productivity is poor, and has high shrinkage at the time of curing, which could cause a bad effect such as distortion etc. on the parts. Further, after curing, there are problems that yellowing or crack, etc., occur at high temperature. Therefore, development of a substitute material has been earnestly desired.

In Patent Literature 1, there is disclosed a transparent impact-relieving material for a platy optical display which is obtained by curing a silicone composition.

In Patent Literature 2, there is disclosed a technique in which with regard to electronic parts such as a transistor, diode, capacitor, coil, LSI, IC, etc., encapsulated by an encapsulating resin such as an epoxy resin, a polyphenylene sulfide resin, etc., a liquid state specific thermosetting silicone resin composition is impregnated between gap(s) frequently causing an interface between the encapsulating resin and a lead of the electronic parts, or gap(s) inherently possessed by the electronic parts themselves due to structural reason to recover the encapsulated state.

PRIOR ART LITERATURES

Patent Literatures

[Patent Literature 1] JP 2004-117831A
[Patent Literature 2] JP H09-169908A

DISCLOSURE OF THE INVENTION

Problems to be Solved by the Invention

The transparent impact-relieving material disclosed in Patent Literature 1 is a platy material in which a silicone composition has been cured. When one is intended to adhere a base portion and a translucent protective portion of an image display device having an image display portion by using the platy transparent impact-relieving material, foams are likely entered at the time of lamination, and after lamination, peeling is sometimes caused at high temperature, and foams are likely entered, and legibility is likely lowered.

The thermosetting silicone resin composition disclosed in Patent Literature 2 uses a linear polyorganohydrogensiloxane in which three or more hydrogen atoms bonded to a silicon atom exist at the side chain of the molecular chain per one molecule, but its reactivity is low so that there are problems that curing rate at low temperature is slow or did not cure within a predetermined period of time.

As mentioned above, a composition which is a heat-curable polyorganosiloxane composition having a little cure shrinkage, excellent impact resistance and good reliability at high temperatures after curing, and good wetting property with a base portion and a protective portion particularly when it is used for adhesion of the base portion and the translucent protective portion of an image display device having an image display portion has not yet been sufficiently accomplished by the prior art techniques, and such a composition has been further demanded in recent years, wherein an image display device is required to have high brightness and high fineness with a variety of the sizes.

The present invention relates to a heat-curable polyorganosiloxane composition which is a composition having good wetting property with a base portion and a protective portion, a little cure shrinkage, excellent impact resistance and good reliability at high temperatures after curing, and an object thereof is to provide a composition having good wetting property with a base portion and a protective portion particularly when it is used for adhesion of the base portion and the translucent protective portion of an image display device having an image display portion.

Means to Solve the Problems

The present invention relates to a heat-curable polyorganosiloxane composition comprising
(A) a linear polyorganosiloxane represented by the formula (I):

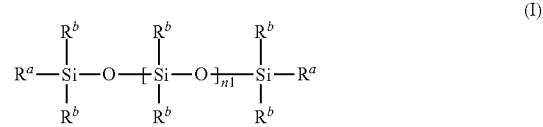

wherein
each $R^a$ independently represents a $C_2$-$C_6$ alkenyl group,
each $R^a$ independently represents a $C_1$-$C_6$ alkyl group or a phenyl group, n1 is a number which makes a viscosity of (A) at 23° C. 2000 cP or lower;

(B1) a linear polyorganosiloxane represented by the formula (II):

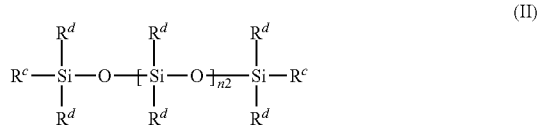

wherein
$R^c$ is a hydrogen atom,
each $R^d$ independently represents a $C_1$-$C_6$ alkyl group or a phenyl group,
n2 is a number which makes a viscosity of (B1) at 23° C. 0.1 to 300 cP;

(B2) a cyclic polyorganohydrogensiloxane comprising an $R^e{}_2HSiO_{1/2}$ unit (wherein $R^e$ represents a hydrogen atom or a $C_1$-$C_6$ alkyl group) and an $SiO_{4/2}$ unit, and having 3 or more hydrogen atoms bonded to a silicon atom in one molecule;

(C) a platinum series catalyst; and
(D) an adhesion promoter,
a ratio of a sum $(H_{B1}+H_{B2})$ of a number $H_{B1}$ of the hydrogen atom(s) bonded to a silicon atom of (B1) and a number $H_{B2}$ of the hydrogen atom(s) bonded to a silicon atom of (B2) based on a number $Vi_A$ of the alkenyl group(s) of (A) is 0.2 to 1.0, and
$H_{B1}$ is 0.5 to 0.8 based on $H_{B1}+H_{B2}$.

Effects of the Invention

According to the present invention, it can be provided a composition which is a heat-curable polyorganosiloxane composition having a little cure shrinkage, and having excellent impact resistance and good reliability at high temperatures after curing, particularly when it is used for adhesion of a base portion and a translucent protective portion of an image display device having an image display portion, a composition having good wetting property with the base portion and the protective portion can be provided.

BEST MODE TO CARRY OUT THE INVENTION (A) in the present invention is an alkenyl group-containing linear polyorganosiloxane represented by the formula (I):

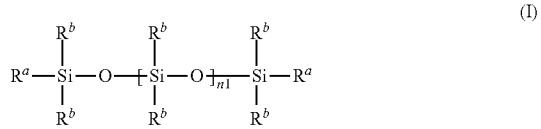

wherein
each $R^a$ independently represents a $C_2$-$C_6$ alkenyl group (for example, vinyl, allyl, 3-butenyl or 5-hexenyl),
each $R^b$ independently represents a $C_1$-$C_6$ alkyl group (for example, methyl, ethyl, propyl, butyl, pentyl, hexyl) or a phenyl group,
n1 is a number which makes a viscosity of (A) at 23° C. 2000 cP or less.

By formulating (A), at the time of curing, stable three-dimensional structure by the cross-linking reaction can be ensured, cure shrinkage can be controlled and prohibited, and good legibility can be ensured.

$R^a$ is more preferably a vinyl group in the viewpoints of easily synthesized, and not impairing flowability of the composition before curing, or heat resistance of the cured product.

$R^b$ is more preferably a methyl group in the viewpoints of easily synthesized, and well balanced in flowability of the composition or mechanical strength after curing, etc.

(A) is preferably a polymethylvinylsiloxane in which the both ends are terminated by a dimethylvinylsiloxane unit, and the intermediate unit comprises a dimethylsiloxane unit.

A viscosity of (A) is 2000 cP or lower at 23° C. in the viewpoint of ensuring stable liquid state of the composition, which can be 100 to 2000 cP, preferably 300 to 2000 cP. It is preferred that the weight average molecular weight of (A) is to be adjusted so that the composition is within the viscosity range. The viscosity of the present invention is a value measured by using a rotational viscometer under the conditions of 60 rpm and 23° C.

(B1) the present invention is a linear polyorganohydrogensiloxane represented by the formula (II):

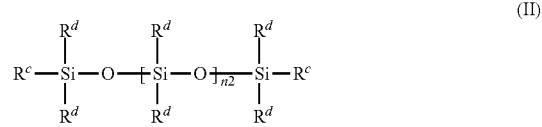

wherein
$R^c$ is a hydrogen atom,
each $R^d$ independently represents a $C_1$-$C_6$ alkyl group (for example, methyl, ethyl, propyl, butyl, pentyl, hexyl) or a phenyl group,
n2 is a number which makes a viscosity of (B1) at 23° C. 0.1 to 300 cP.

$R^d$ is preferably a methyl group in the viewpoints of easily synthesized, and excellent in balance of characteristics such as mechanical strength and flowability before curing, etc.

(B1) is preferably a polymethylhydrogensiloxane in which the both ends are terminated by a dimethylhydrogensiloxane unit, and the intermediate unit comprises a dimethylsiloxane unit.

The viscosity of (B1) is 0.1 to 300 cP at 23° C., preferably 1 to 200 cP.

(B2) of the present invention is a cyclic polyorganohydrogensiloxane comprising an $R^e{}_2HSiO_{1/2}$ unit (wherein $R^e$ represents a hydrogen atom or a $C_1$-$C_6$ alkyl group (for example, methyl, ethyl, propyl, butyl, pentyl, hexyl)) and an $SiO_{4/2}$ unit, and having three or more hydrogen atoms bonded to the silicon atom in one molecule, and is a component which contributes to control the hardness by forming a cross-linking in the cured product. $R^e$ as the hydrogen atom is preferably 3 to 100 in one molecule, more preferably 3 to 50. $R^e$ as the $C_1$-$C_6$ alkyl group is preferably methyl in the point of easily synthesized, etc.

As (B2), it is preferred that a ratio of the $R^e{}_2HSiO_{1/2}$ unit and the $SiO_{4/2}$ unit is 1.5 to 2.2 mol of the $R^e{}_2HSiO_{1/2}$ unit per 1 mol of the $SiO_{4/2}$ unit, further preferably 1.8 to 2.1 mol. Typically, it is preferred that 3 to 5 $SiO_{4/2}$ units forms a cyclic siloxane skeleton such as $[R^e{}_2HSiO_{1/2}]_8[SiO_{4/2}]_4$ and $[R^e{}_2HSiO_{1/2}]_{10}[SiO_{4/2}]_5$, where two $R^e{}_2HSiO_{1/2}$ units are bonded to each $SiO_{4/2}$ unit, particularly preferably those where two $(CH_3)_2HSiO_{1/2}$ units are bonded to each $SiO_{4/2}$ unit.

The viscosity of (B2) is preferably 1 to 100 cP, more preferably 1 to 50 cP.

In the viewpoint of providing a suitable hardness to the cured product, a ratio of the sum $(H_{B1}+H_{B2})$ of a number $H_{B1}$ of the hydrogen atom(s) bonded to a silicon atom of (B1) and a number $H_{B2}$ of the hydrogen atom(s) bonded to a silicon atom of (B2) based on a number $Vi_A$ of the alkenyl group(s) bonded to a silicon atom of (A):

$$(H_{B1}+H_{B2})/Vi_A$$

is 0.2 to 1.0, preferably 0.5 to 1.0.

Also, in the viewpoints of ensuring impact resistance and reliability at high temperature of the cured product, $H_{B1}$ is 0.5 to 0.8 based on $H_{B1}+H_{B2}$, preferably 0.6 to 0.8.

(C) of the present invention is a catalyst to promote the addition reaction between the alkenyl group of (A) and hydrosilyl groups of (B1) and (B2). In the viewpoint of good catalyst activity, a compound of a platinum group-metal atom such as platinum, rhodium and palladium is suitably used, it is preferably mentioned a platinum compound such as chloroplatinic acid, a reaction product of chloroplatinic acid and an alcohol, a platinum-olefin complex, a platinum-vinylsiloxane complex, a platinum-ketone complex and a platinum-phosphine complex, a rhodium compound such as a rhodium-phosphine complex and a rhodium-sulfide complex, a palladium compound such as a palladium-phosphine complex, more preferably a platinum compound, and further preferably a platinum-vinylsiloxane complex.

(C) is formulated, in terms of a platinum group-metal atom, preferably in an amount of 0.1 to 1000 weight ppm based on the formulated weight of (A) in the viewpoint of ensuring a suitable curing rate, more preferably 0.5 to 200 weight ppm.

(D) of the present invention is an adhesion promoter, and an alkoxysilane can be mentioned. For example, there may be used a reaction product of 1,1,3,5,7-pentamethylcyclo-tetrasiloxane and 3-methacryloxypropyltrimethoxysilane.

More specifically, it may be preferably mentioned an alkoxysilane having a side chain represented by the following formula:

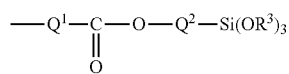

(I)

wherein $Q^1$ and $Q^2$ each independently represent an alkylene group,
preferably a $C_1$-$C_4$ alkylene group, and $R^3$ represents a $C_1$-$C_4$ alkyl group.

Such alkoxysilanes may be mentioned the following compounds.

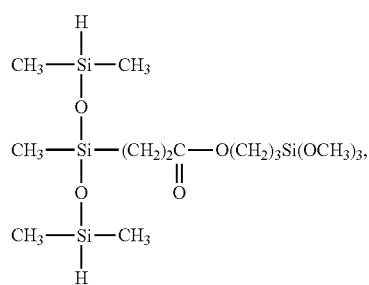

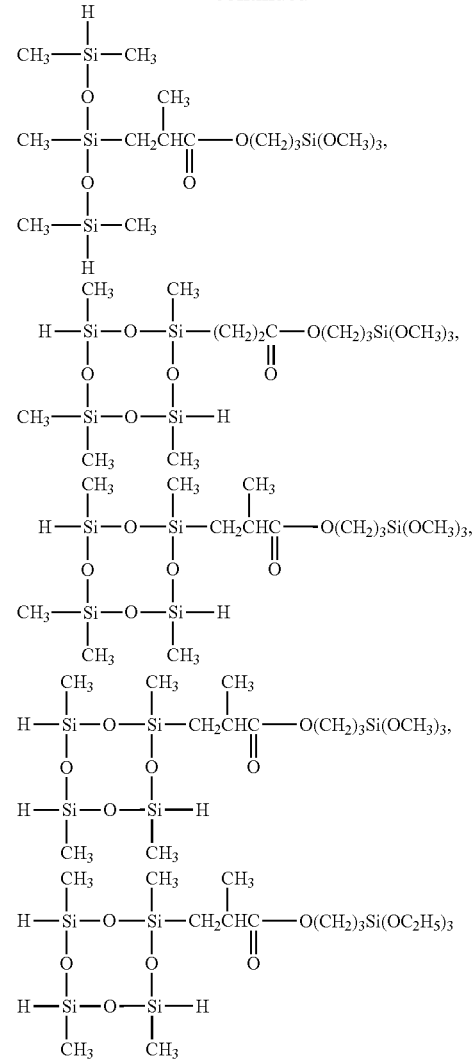

(D) is preferably 0.1 to 2 parts by weight based on 100 parts by weight of (A) in the viewpoint of ensuring suitable adhesiveness, more preferably 0.5 to 1 parts by weight.

To the composition of the present invention may be formulated a curing retarder or inorganic filler, etc., within the range which does not impair the effects of the present invention. The curing retarder may be exemplified by an acetylene compound such as 3-methyl-1-butyn-3-ol, 3-methyl-1-pentyn-3-ol, 3,5-dimethyl-1-hexyn-3-ol, 1-ethynyl-1-cyclohexanol, etc. a vinyl group-containing cyclic siloxane in which a vinyl group is bonded to a cyclic silicon atom, etc., such as 1,3,5,7-tetravinyl-1,3,5,7-tetramethylcy-clotetrasiloxane, etc. The inorganic filler may be exemplified by a dry fine particle silica such as fumed silica and are silica, and fumed silica is preferred. Also, the surface of the silica may be treated by a silazane compound such as hexamethyldisilazane and 1,3-divinyl-1,1,3,3-tetramethyld-isilazane; or a polyorganosiloxane such as octamethylcyclo-tetrasiloxane.

The composition of the present invention can be prepared by mixing and kneading (A), (B1), (B2), (C), (D) and other component(s) further formulated depending on necessity uniformly, by a mixing means such as an almighty kneading machine, a kneader, etc.

The composition of the present invention preferably has a viscosity at 23° C. of 2000 cP or lower in the point of spreadability at the time of coating, and can be made 50 to 2000 cP. It is more preferably 80 to 1500 cP, further preferably 300 to 1000 cP.

The composition of the present invention can be used for adhesion of a base portion and a translucent protective portion of an image display device having an image display portion, and when the image display device is a large sized (50 to 100 inches), the viscosity of the composition is preferably 50 to 300 cP in the point of spreadability at the time of coating. In the point of obtaining a composition having such a viscosity, it is preferred to use (A) having a viscosity of 50 to 300 cP. On the other hand, in the case of the small sized image display device (less than 50 inches) such as a cellular phone, etc., the viscosity of the composition is preferably 300 to 2000 cP in the point of workability. In the point of obtaining a composition having such a viscosity, it is preferred to use (A) having a viscosity of 300 to 2000 cP.

The composition of the present invention can be made a transmittance after curing 80 to 100%, preferably 90 to 100%. It has a good transmittance, so that it is also good in the point of legibility after heat-curing the composition between the base portion and the translucent protective portion of the image display device having an image display portion.

The composition of the present invention can be cured at a heating temperature of 50 to 80° C. A heating time can be optionally set, and, for example, it can be made 0.1 to 3 hours.

According to the composition of the present invention, E hardness after curing can be made 1 to 40. By making the E hardness within the range, after heat-curing the composition between the base portion and the translucent protective portion of the image display device having an image display portion, a stress from outside can be suitably relaxed to ensure deforming resistance, and legibility can be ensured. The E hardness can be adjusted by regulating the ratio of (B1) and (B2). The E hardness in the present invention is made a value measured according to JIS K 6253 E. When the image display device is a large size, the E hardness is preferably 1 to 30. On the other hand, with regard to the small sized image display device such as a cellular phone which are assumed to be carried by a person, so that the E hardness after curing is 10 to 40 in the viewpoint of durability, preferably 15 to 40.

The composition of the present invention can adhere a base portion and a translucent protective portion of an image display device by coating onto the base portion of the image display portion, laminating the protective portion, and subjecting to heating using a dryer, etc., to cure the composition. To the base portion of the image display portion, a step may be provided at the peripheral portion, if necessary, to prevent from outflow of the composition. The composition of the present invention has a little cure shrinkage, so that it can be suitably used for the production of a large scale image display device having an image display portion (panel) of preferably 5 to 100 inches, but the present invention is not limited by these.

EXAMPLES

In the following, the present invention will be explained in more detail by referring to Examples and Comparative examples. However, the present invention is not limited by these Examples.

Each composition of Examples and Comparative examples were prepared by the composition shown in Table 1 by mixing and kneading each components by using hands.

Each component used is as follows.

A-1: A polymethylvinylsiloxane (a viscosity at 23° C. of 870 cP) in which the both ends are terminated by a dimethylvinylsiloxane unit, and the intermediate unit comprises a dimethylsiloxane unit A-2: A polymethylvinylsiloxane (a viscosity at 23° C. of 350 cP) in which the both ends are terminated by a dimethylvinylsiloxane unit, and the intermediate unit comprises a dimethylsiloxane unit A-3: A polymethylvinylsiloxane (a viscosity at 23° C. of 100 cP) in which the both ends are terminated by a dimethylvinylsiloxane unit, and the intermediate unit comprises a dimethylsiloxane unit A-4: A polymethylvinylsiloxane (a viscosity at 23° C. of 2000 cP) in which the both ends are terminated by a dimethylvinylsiloxane unit, and the intermediate unit comprises a dimethylsiloxane unit A-5: A polymethylvinylsiloxane (a viscosity at 23° C. of 110 cP) in which the both ends are terminated by a dimethylvinylsiloxane unit, and the intermediate unit comprises a dimethylsiloxane unit B1: A polymethylhydrogensiloxane (a viscosity at 23° C. of 20 cP) in which the both ends are terminated by a dimethylhydrogensiloxane unit, and the intermediate unit comprises a dimethylsiloxane unit B2: Average unit formula of $[H(CH_3)_2SiO_{1/2}]_8[SiO_{4/2}]_4$ (Effective hydrogen amount: 1%)

B3: A polymethylhydrogensiloxane in which the both ends are terminated by a trimethylsiloxane unit, and the intermediate unit comprises a dimethylsiloxane unit and a methylhydrogensiloxane unit C: A complex obtained by heating chloroplatinic acid and 1,3,5,7-tetravinyl-1,3,5,7-tetramethylcyclotetrasiloxane with a molar ratio of 1:2, and a platinum content of 2% by weight.

D: A reaction product of 1,1,3,5,7-pentamethylcyclotetrasiloxane and 3-methacryloxypropyltrimethoxysilane E: 3,5-Dimethyl-1-hexyn-3-ol Evaluation of the physical properties was carried out as follows. The results are shown in Table 1.

(1) Viscosity

A viscosity at 23° C. was measured by using a rotational viscometer (Vismetron VDA-L) (manufactured by Shibaura System Co., Ltd.) under the conditions of 60 rpm and a rotor No. 3.

(2) E Hardness after Curing

Each composition of Examples and Comparative examples was so coated on a Teflon (Registered Trademark)-coated mold that the thickness became 6 mm, and then, cured by heating at 70° C. for 1 hour.

According to JIS K 6253 E, an E hardness of the cured product at 23° C. was measured by DUROMETER HARDNESS TYPE E (manufactured by ASKER).

(3) Wetting Property with Parts

At the center of a glass plate with a size of 5 cm square and clean, which had been washed with a neutral detergent and dried, 2 g of the composition was dropped from a 10 ml bottle, and evaluated with a time until it spread at the end of the glass. Evaluation was carried out at the temperature of 23° C. and the humidity of 50%.

(4) Coloring at High Temperature

Each composition of Examples and Comparative examples was so coated between two sheets of 1 mm thick glass plates that the thickness became 200 am, and cured at 70° C. for 1 hour. This sample was allowed to stand in a thermostat chamber set to high temperature condition of 85° C. for 500 hours, then, returned to the condition of 23° C., and an yellow index which is an index showing the degree of coloring was measured by a spectrophotometer (CM-3500d manufactured by Minolta Co., Ltd.) to evaluate the samples.

(5) Change in High Humidity

Each composition of Examples and Comparative examples was so coated between 3 inches of a glass panel having 0.6 mm-thick and 3 inches of a PMMA panel having 0.5 mm-thick that the thickness became 0.2 mm-thick, and cured at 70° C. for 1 hour. This sample was allowed to stand in a thermostat chamber set to high temperature and high humidity condition of 85° C. and 85% RH for 500 hours, then, returned to the condition of 23° C. and 50% RH, and the state of the sample was observed. When peeling or resin crack was observed at the cured product, then, it was judged as X, and when no peeling or resin crack was observed, then, it was judged as ◯.

(6) Heat Shock

Each composition of Examples and Comparative examples was coated between 3 inches of a glass panel having 0.6 mm-thick and 3 inches of a PMMA panel having 0.5 mm-thick that the thickness became 0.2 mm-thick, and cured at 70° C. for 1 hour. The sample was subjected to an environmental test (Name of apparatus: TSA-71S-A manufactured by ESPEC Corp.) with heat cycles of 300 times (maintained for 30 minutes for each temperature) from −50° C. to 125° C.

Thereafter, the sample was returned to the condition of 23° C., and the state of the cured product was observed. When 0.02 mm or more of crack(s) and/or an air layer with the maximum diameter of 0.02 mm or more was observed at the cured product, then, it was judged as X, and when no crack, air layer or damage was observed, then, it was judged as ◯.

(7) Cure Shrinkage

A specific gravity of the composition before curing was measured by a specific gravity cup, a specific gravity after curing was measured by an electronic gravimeter (SD-120L manufactured by MIRAGE CO.), and calculated from the difference of these specific gravities according to the following equation.

Cure shrinkage (%)=(Specific gravity after curing−Specific gravity before curing)/Specific gravity after curing×100

(8) Dot Pressing Test

Each composition of Examples and Comparative examples was so coated that it became 0.2 mm-thick between 3.5 inches of a glass panel having 0.6 mm-thick and 3.5 inches of a PMMA panel having 0.5 mm-thick, and cured at 70° C. for 1 hour.

By making the PMMA plate side of the sample upside, a metal rod having a semicircular tip with a diameter of 10 mm was pressed thereon up to 10 kgf with a rate of a predetermined load of 7.5 mm/min.

With regard to one sample, five points in the 3.5 inches were substantially uniformly pressured with the above-mentioned conditions.

According to this pressurization, fine cracks occur at the pressed portion of the cured product, or peeling occurs between the glass plate or the PMMA plate and the cured product. Appearance of the pressed portion changes to white color due to the presence of the cracks or peeling as compared with the non-pressed portion. Changes of the appearance were observed with naked eyes, and evaluated with the standard that one or more appearance changes were not observed in one sample, then, it was judged as ◯, and one or more appearance changes were observed in one sample, then, it was judged as X.

(9) Transmittance

Each composition of Examples and Comparative examples was coated between two sheets of 1 mm-thick glass plates so that it became 200 μm-thick, and cured at 70° C. for 1 hour. The cured sample was allowed to stand in a thermostat chamber set to high temperature condition of 85° C. for 500 hours, and then, returned to the condition of 23° C., a transmittance which is an index showing the degree of transparency was measured by a spectrophotometer (CM-3500d manufactured by Minolta Co., Ltd.) to evaluate the samples.

TABLE 1

| | | Example 1 | Example 2 | Example 3 | Example 4 | Example 5 | Example 6 | Example 7 | Comparative example 1 |
|---|---|---|---|---|---|---|---|---|---|
| Component A | Parts by weight | 100 | 100 | 100 | 100 | 100 | 100 | 100 | 100 |
| | (Kind) | A-3 | A-5 | A-2 | A-1 | A-1 | A-1 | A-4 | A-1 |
| | Viscosity cP | 100 | 110 | 350 | 870 | 870 | 870 | 2000 | 870 |
| | Number of alkenyl group in Component A $Vi_A$ mmol | 35 | 34.9 | 18 | 16 | 16 | 16 | 10.7 | 16 |
| B1 | Parts by weight | 16 | 15 | 5.2 | 6.3 | 6.3 | 6.3 | 4.18 | 6.3 |
| | Viscosity cP | 20 | 20 | 20 | 20 | 20 | 20 | 20 | 20 |
| | Number of hydrogen atom in Component B1 $H_{B1}$ mmol | 20.8 | 19.35 | 6.76 | 8.19 | 8.19 | 8.19 | 5.39 | 8.19 |
| B2 (Comparative example 1 is B3) | Parts by weight | 0.54 | 0.5 | 0.68 | 0.22 | 0.27 | 0.38 | 0.68 | 0.31 |
| | Viscosity cP | 20 | 20 | 20 | 20 | 20 | 20 | 20 | 20 |
| | Number of hydrogen atom in Component B2 $H_{B2}$ mmol | 5.4 | 5.1 | 6.8 | 2.2 | 2.7 | 3.8 | 5.1 | 2.7 |
| | $H_{B1} + H_{B2}$ | 26.20 | 24.45 | 13.56 | 10.39 | 10.89 | 11.99 | 10.49 | 10.89 |
| | $H_{B1}/(H_{B1} + H_{B2})$ | 0.79 | 0.79 | 0.50 | 0.79 | 0.75 | 0.68 | 0.51 | 0.75 |
| | $(H_{B1} + H_{B2})/Vi_A$ | 0.75 | 0.7 | 0.75 | 0.65 | 0.68 | 0.75 | 0.98 | 0.68 |
| (C) | Parts by weight (in terms of platinum) | 5 ppm | 5 ppm | 5 ppm | 5 ppm | 5 ppm | 5 ppm | 5 ppm | 5 ppm |

TABLE 1-continued

| | Example 1 | Example 2 | Example 3 | Example 4 | Example 5 | Example 6 | Example 7 | Comparative example 1 |
|---|---|---|---|---|---|---|---|---|
| (D) Parts by weight | 0.6 | 0.81 | 0.9 | 0.9 | 0.9 | 0.9 | 0.44 | 0.9 |
| (E) Parts by weight | 0.03 | 0.03 | 0.03 | 0.03 | 0.03 | 0.03 | 0.03 | 0.03 |
| Viscosity of composition [cP] | 80 | 100 | 300 | 740 | 740 | 740 | 1800 | 740 |
| E hardness | 23 | 5 | 27 | 10 | 24 | 39 | 15 | Uncured |
| Wetting property (coating property) [sec.] | 3 | 3 | 15 | 28 | 28 | 28 | 70 | 28 |
| Coloring at high temperature Yellow index | 0.4 | 0.4 | 0.3 | 0.2 | 0.2 | 0.2 | 0.2 | Cannot be measured |
| Change at high humidity (resin crack) 85° C. 85% RH | ○ | ○ | ○ | ○ | ○ | ○ | ○ | Cannot be measured |
| Heat shock −55 to 125° C. peeling | ○ | ○ | ○ | ○ | ○ | ○ | ○ | Cannot be measured |
| Cure shrinkage [%] | 0.63 | 0.63 | 0.62 | 0.60 | 0.60 | 0.60 | 0.60 | Cannot be measured |
| Impact resistance (Dot pressing test) | ○ | ○ | ○ | ○ | ○ | ○ | ○ | Cannot be measured |
| Transmittance [%] 400 nm | 98.3 | 98.5 | 98.5 | 99.0 | 99.0 | 99.0 | 99.0 | Cannot be measured |

Each composition of Examples has good wetting property with parts, a little cure shrinkage, excellent impact resistance and good reliability at high temperatures after curing. From the above, it can be understood that the composition of the present invention is suitable for the preparation of an image display device. Comparative example which has used a linear polyorganohydrogensiloxane did not cure by heating under the conditions of 70° C. for 1 hour.

UTILIZABILITY IN INDUSTRY

The heat-curable polyorganosiloxane compositions of the present invention are useful for adhesion of a base portion and a translucent protective portion of an image display device having an image display portion such as a cathode-ray tube, liquid crystal, plasma, organic EL, etc.

The invention claimed is:

1. A heat-curable polyorganosiloxane composition which comprises
    (A) an alkenyl group-containing linear polyorganosiloxane represented by the formula (I):

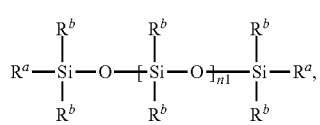

(I)

wherein
    each $R^a$ independently represents a $C_2$-$C_6$ alkenyl group,
    each $R^b$ independently represents a $C_1$-$C_6$ alkyl group or a phenyl group,
    n1 is a number which results in a viscosity of (A) at 23° C. of 2000 cP or less;
(B1) a linear polyorganohydrogensiloxane represented by the formula (II):

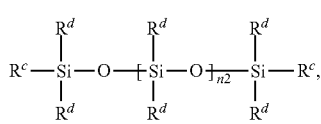

(II)

wherein
    $R^c$ is a hydrogen atom,
    $R^d$ is a methyl group,
    n2 is a number which results in a viscosity of (B1) at 23° C. of 0.1 to 20 cP;
(B2) a cyclic polyorganohydrogensiloxane comprising an $R^e{}_2HSiO_{1/2}$ unit, wherein $R^e$ represents a hydrogen atom or a $C_1$-$C_6$ alkyl group, and an $SiO_{4/2}$ unit, and having 3 or more hydrogen atoms bonded to a silicon atom in one molecule, wherein a ratio of the moles of the $R^e{}_2HSiO_{1/2}$ unit to the moles of the $SiO_{4/2}$ unit is 1.5 to 2.2 moles of the $R^e{}_2HSiO_{1/2}$ unit per 1 mole of the $SiO_{4/2}$ unit;
(C) a platinum series catalyst; and
(D) an adhesion promoter;
    wherein a first ratio $(H_{B1}+H_{B2})/Vi_A$ is 0.2 to 1.0 and a second ratio $H_{B1}/(H_{B1}+H_{B2})$ is 0.5 to 0.8, $Vi_A$ is a number of alkenyl group(s) of (A), $H_{B1}$ is a number of the hydrogen atom(s) bonded to a silicon atom of (B1), $H_{B2}$ is a number of the hydrogen atom(s) bonded to a silicon atom of (B2), and (D) is a reaction product of 1,1,3,5,7-pentamethylcyclotetrasiloxane and 3-methacryloxy-propyltrimethoxysilane, and (D) is in an amount of 0.1 to 2 parts by weight based on 100 parts by weight of (A), wherein, upon curing, the heat-curable polyorganosiloxane composition has an E hardness of 1 to 40 measured according to JIS K 6253 E.

2. The heat-curable polyorganosiloxane composition according to claim 1, wherein (B2) is a cyclic polyorganohydrogensiloxane in which 3 to 5 $SiO_{4/2}$ units form a cyclic siloxane skeleton, and 2 $R^e{}_2HSiO_{1/2}$ units are bonded to each $SiO_{4/2}$ unit.

3. An image display device comprising (i) a base portion, (ii) a translucent protective portion and (iii) an adhesive which adheres the base portion to the translucent portion, said adhesive comprising the heat-curable polyorganosiloxane composition according to claim 1.

4. An image display device comprising (i) a base portion, (ii) a translucent protective portion and (iii) an adhesive which adheres the base portion to the translucent protective portion, said adhesive comprising the heat-curable polyorganosiloxane composition according to claim 2.

* * * * *